US008057135B2

(12) United States Patent
Nordlin et al.

(10) Patent No.: US 8,057,135 B2
(45) Date of Patent: Nov. 15, 2011

(54) AUGER BIT WITH INTERLOCKING FEED SCREW AND CUTTING INSERT

(75) Inventors: William Nordlin, Poplar Grove, IL (US); Peter Czyzewski, Winnebago, IL (US)

(73) Assignee: Greenlee Textron Inc., Rockford, IL (US)

( * ) Notice: Subject to any disclaimer, the term of this patent is extended or adjusted under 35 U.S.C. 154(b) by 451 days.

(21) Appl. No.: 12/273,853

(22) Filed: Nov. 19, 2008

(65) Prior Publication Data

US 2010/0124467 A1 May 20, 2010

(51) Int. Cl.
*B23B 51/02* (2006.01)

(52) U.S. Cl. ......... 408/214; 408/230; 408/231; 408/713

(58) Field of Classification Search .................... 408/57, 408/59, 161–162, 164–167, 214, 153, 181, 408/231–233, 713, 230
See application file for complete search history.

(56) References Cited

U.S. PATENT DOCUMENTS

| | | | | | |
|---|---|---|---|---|---|
| 29,883 | A | * | 9/1860 | Hathaway | 408/212 |
| 1,389,578 | A | | 9/1921 | Charlton | |
| 2,237,901 | A | * | 4/1941 | Chun | 408/59 |
| 2,290,933 | A | * | 7/1942 | Andreasson | 76/108.1 |
| 2,360,385 | A | * | 10/1944 | Anderson | 408/59 |
| 2,411,209 | A | * | 11/1946 | Furth et al. | 15/104.09 |
| 2,775,149 | A | * | 12/1956 | Thomas | 408/185 |
| 2,913,935 | A | * | 11/1959 | Flannery et al. | 408/198 |
| 3,220,288 | A | * | 11/1965 | Yogus | 408/197 |
| RE28,900 | E | * | 7/1976 | Byers et al. | 408/201 |
| 4,625,593 | A | | 12/1986 | Schmotzer | |
| 5,820,319 | A | | 10/1998 | Hull et al. | |
| 6,024,520 | A | | 2/2000 | Haughton et al. | |
| 6,361,255 | B1 | | 3/2002 | Schmotzer | |
| 7,625,160 | B2 | * | 12/2009 | Zeiler et al. | 408/213 |
| 7,909,547 | B2 | * | 3/2011 | Jordan et al. | 408/214 |
| 2009/0208300 | A1 | * | 8/2009 | Durfee | 408/1 BD |

* cited by examiner

*Primary Examiner* — Daniel Howell
(74) *Attorney, Agent, or Firm* — Clark Hill PLC

(57) ABSTRACT

An auger bit includes a shaft having a central axis, a cutting insert mounted to said shaft, and a feed screw that is separate from the cutting insert and which is mounted to the shaft. The cutting insert and the feed screw are engaged with each other. A single locking member, such as a set screw, secures the feed screw member to the shaft, and thereby secures the cutting insert to the shaft. If the feed screw or the cutting insert become worn, feed screw or the cutting insert can be replaced.

15 Claims, 5 Drawing Sheets

AUGER BIT WITH INTERLOCKING FEED SCREW AND CUTTING INSERT

BACKGROUND OF THE INVENTION

Auger bits have been used to drill holes in utility poles made of wood for a number of years. These auger bits usually have a feed screw near their tip that helps propel the bit through a pole, at least one cutting edge located below the feed screw near the outer circumference of the main shaft of the auger bit that enables the auger bit to cut through the wood, a main shaft with a generally cylindrical shape that has at least one flute that extends from the cutting edge and allows chips formed by the auger bit as it bores into a pole to be removed from the cutting site, and a shank portion that has a diameter that is less than the main shaft that extends from the bottom of the main shaft of the auger bit.

The shank portion typically has three flats milled about its periphery which allow it to be easily held in a chuck of a powered drill or impact wrench which can be used by the user to cause the auger bit as a whole to rotate. As the auger bit rotates, the threads of the feed screw help to propel the auger bit through the pole, making it easier for the user to complete the boring operation. At the same time, the cutting edges remove material as the auger bit rotates and send this material along the flute of the bit, allowing deep holes to be bored.

When being used in the field, it is common for an auger bit to hit nails that are within the wooden pole. This can cause damage to the feed screw and cutting edges, impairing the function of the auger bit. For example, the threads of the feed screw could be deformed which prevents the auger bit from self feeding through the pole as it rotates, requiring the user to push and work harder to bore a hole. Likewise, the cutting edges can become chipped or dulled so that they do not efficiently remove wood chips making boring slow. Consequently, a number of techniques have been developed to remedy these problems.

For example, U.S. Pat. No. 1,389,578 discloses an auger bit that has a replaceable insert that has the feed screw and cutting edges incorporated therein. The replaceable insert can be attached to the shaft of the auger bit using a single screw. This design, however, has two disadvantages. First, the manufacturing the insert is difficult and costly because of the configuration of the replaceable insert because it includes both the feed screw and cutting edges. Second, both the feed screw and the cutting edges are replaced regardless of what features have been damaged on the auger bit, forcing the user to buy and use a replacement insert that is often more costly than necessary.

U.S. Pat. No. 5,820,319 discloses an auger bit that has replaceable feed screw that is attached to the shaft by means of a single screw. This technique, however, does not provide for any way to replace worn cutting edges. Therefore, this auger bit does not allow the user to handle situations when the cutting edge has become dull. Conversely, U.S. Pat. No. 6,024,520 discloses replacing cutting edges using a screw to attach the replaceable cutting insert to the shaft, but provides no means to replace the feed screw. Thus, neither U.S. Pat. No. 5,820,319 nor U.S. Pat. No. 6,024,520 provides a suitable way to replace both feed screw and cutting inserts, giving the user the needed flexibility to address problems in the field.

Finally, U.S. Pat. Nos. 4,625,593 and 6,361,255 disclose replaceable feed screws and cutting inserts, but neither show how they can be attached in a quick and effective manner. U.S. Pat. No. 4,625,593 discloses that the insert is brazed onto the shaft making replacement difficult, while U.S. Pat. No. 6,361,255 fails to specify the exact means by which the feed screw and cutting insert are attached in a replaceable manner to the shaft of the auger bit.

Accordingly, there exists a need for an auger bit that has a replaceable feed screw and a replaceable cutting insert that can be attached in a quick manner, and that allows the user to select which feature needs to be replaced in a cost effective way.

BRIEF DESCRIPTION OF THE DRAWINGS

The organization and manner of the structure and operation of the invention, together with further objects and advantages thereof; may best be understood by reference to the following description, taken in connection with the accompanying drawings, wherein like reference numerals identify like elements in which.

SUMMARY OF THE INVENTION

Figure 1:
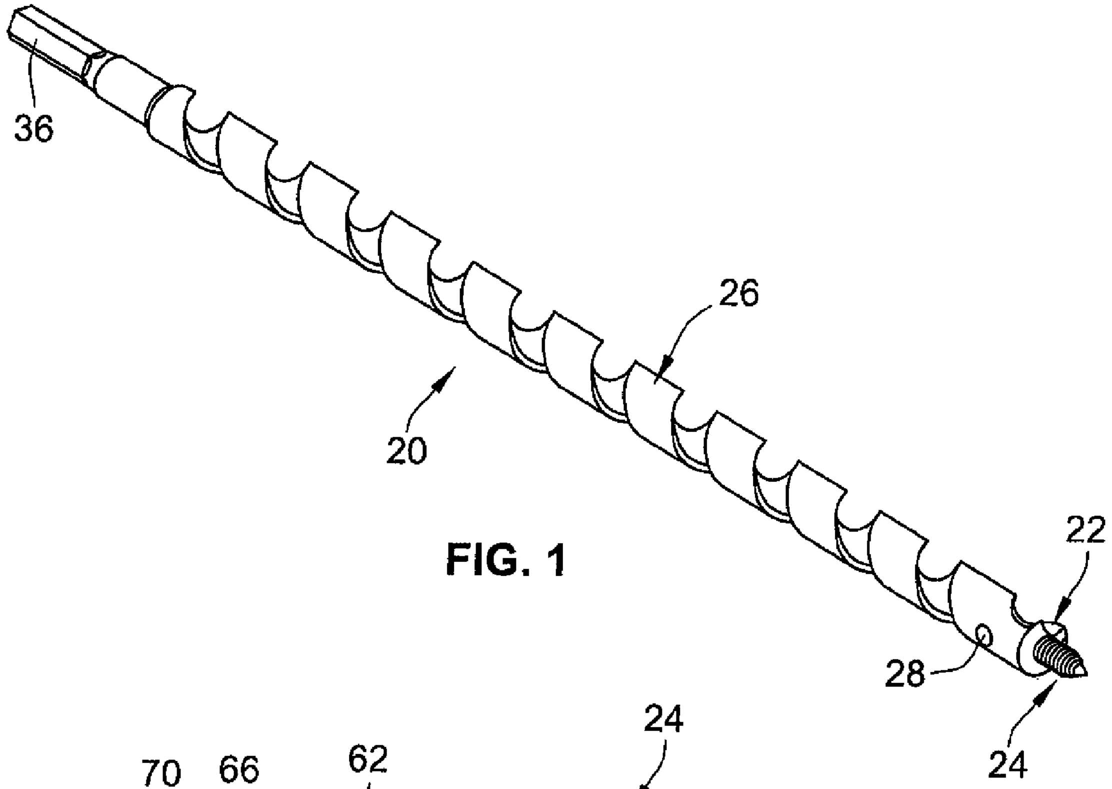
FIG. 1 is perspective view of an auger bit which includes a shaft, an insert and a feed screw, which incorporates the features of the present invention.

Briefly, the present invention discloses an auger bit which includes a shaft having a central axis, a cutting insert mounted to said shaft, and a feed screw that is separate from the cutting insert and which is mounted to the shaft. The cutting insert and the feed screw are engaged with each other. A single locking member, such as a set screw, secures the feed screw member to the shaft, and thereby secures the cutting insert to the shaft. If the feed screw or the cutting insert become worn, feed screw or the cutting insert can be replaced.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 2:
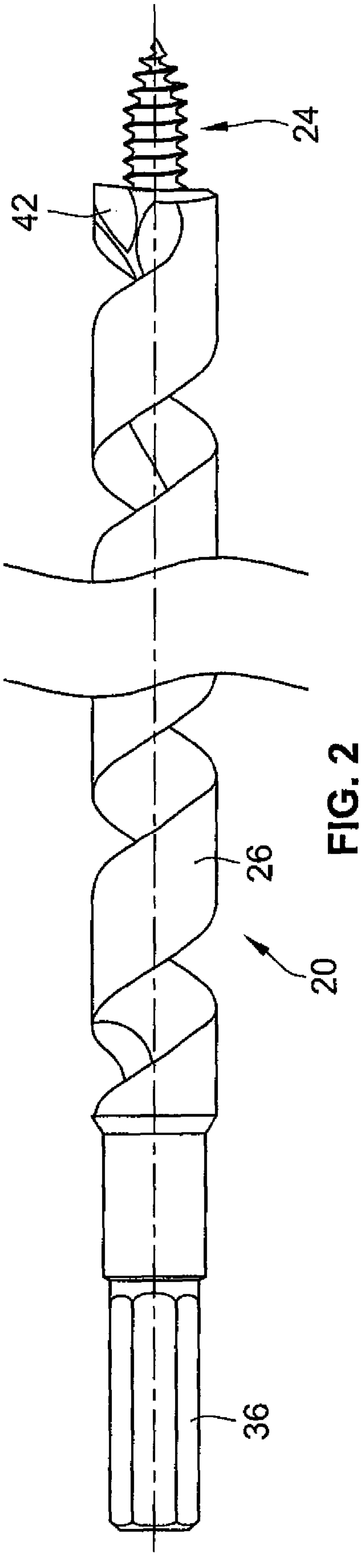
FIG. 2 is a side elevational view of the auger bit.
Figure 3:
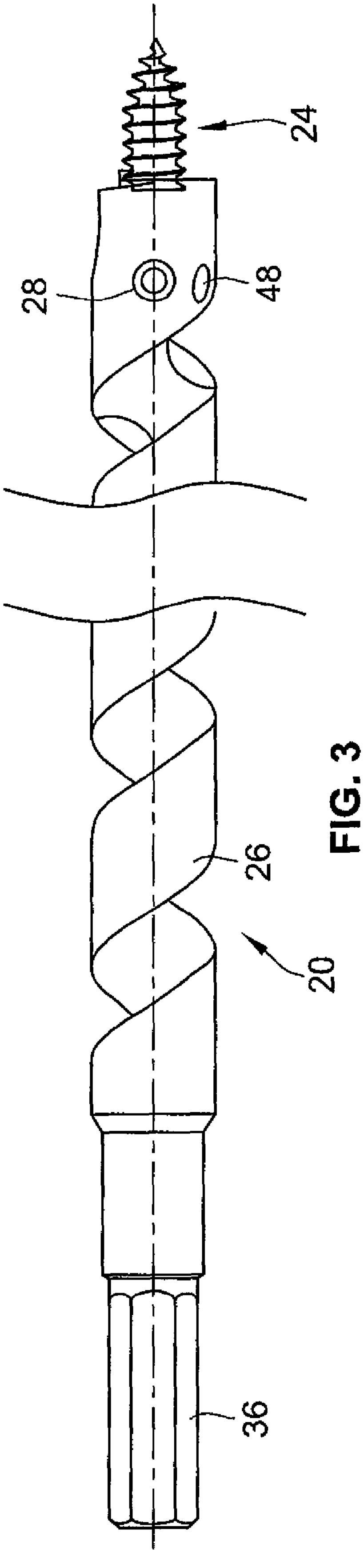
FIG. 3 is an alternate side elevational view of the auger bit.
Figure 4:
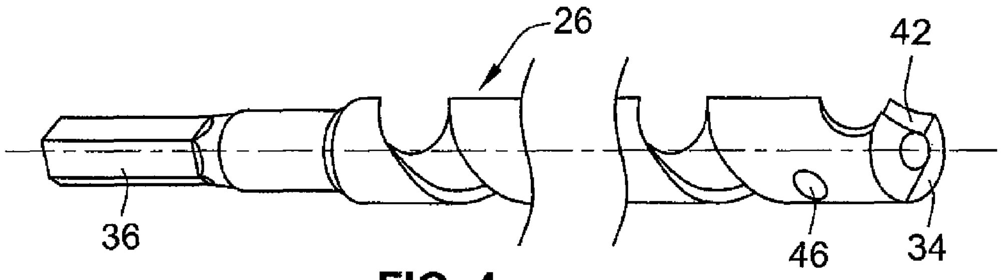
FIG. 4 is a perspective view of a shaft of the auger bit.
Figure 5:
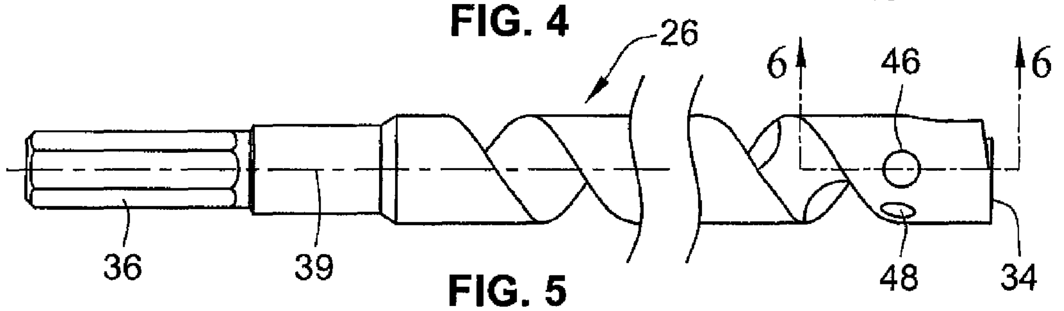
FIG. 5 is a side elevational view of the shaft.
Figure 10:
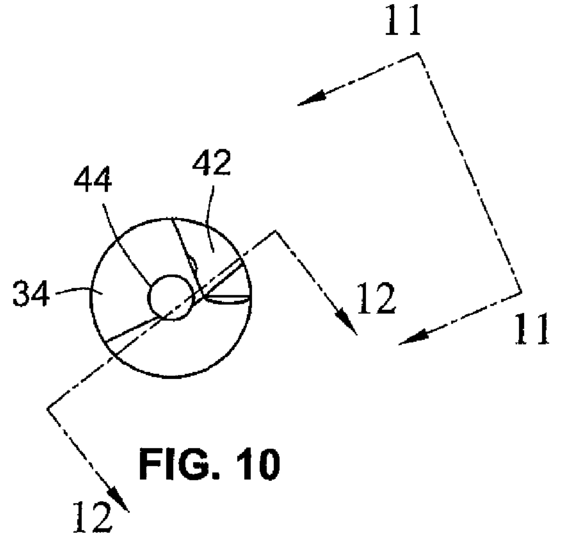
FIG. 10 is an end plan view of the shaft.
Figure 6:
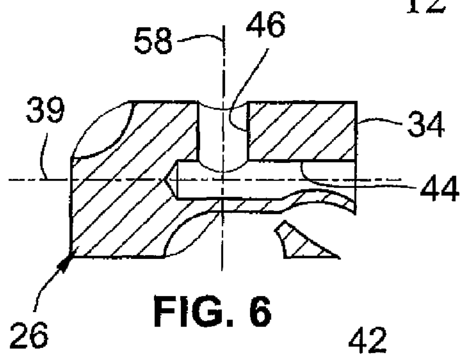
FIG. 6 is a cross-sectional view of the shaft along line 6-6 of FIG. 5.
Figure 12:
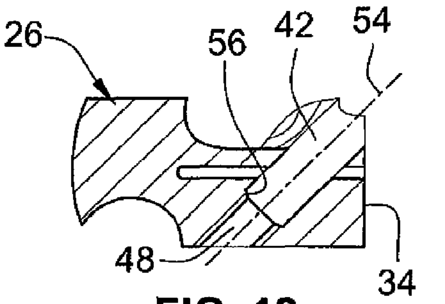
FIG. 12 is a cross-sectional view of the shaft along line 12-12 of FIG. 10.
Figure 11:
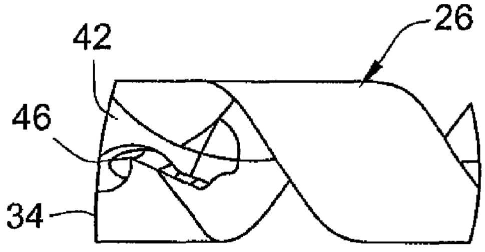
FIG. 11 is a view of the shaft along the view of line 11-11 in FIG. 10.
Figure 9:
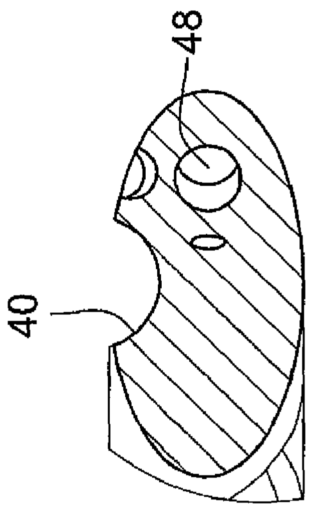
FIG. 9 is a cross-sectional view of the shaft along line 9-9 of FIG. 7.
Figure 8:
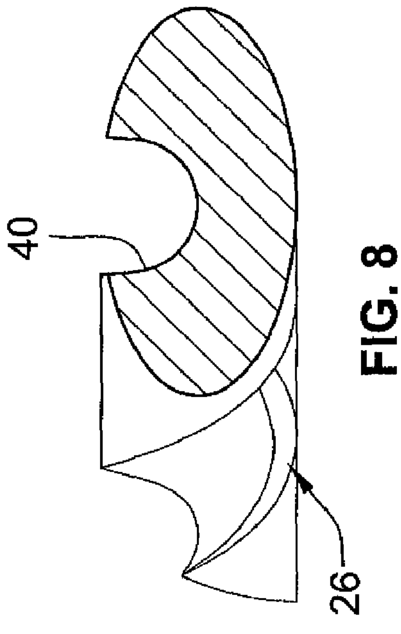
FIG. 8 is a cross-sectional view of the shaft along line 8-8 of FIG. 7.
Figure 7:
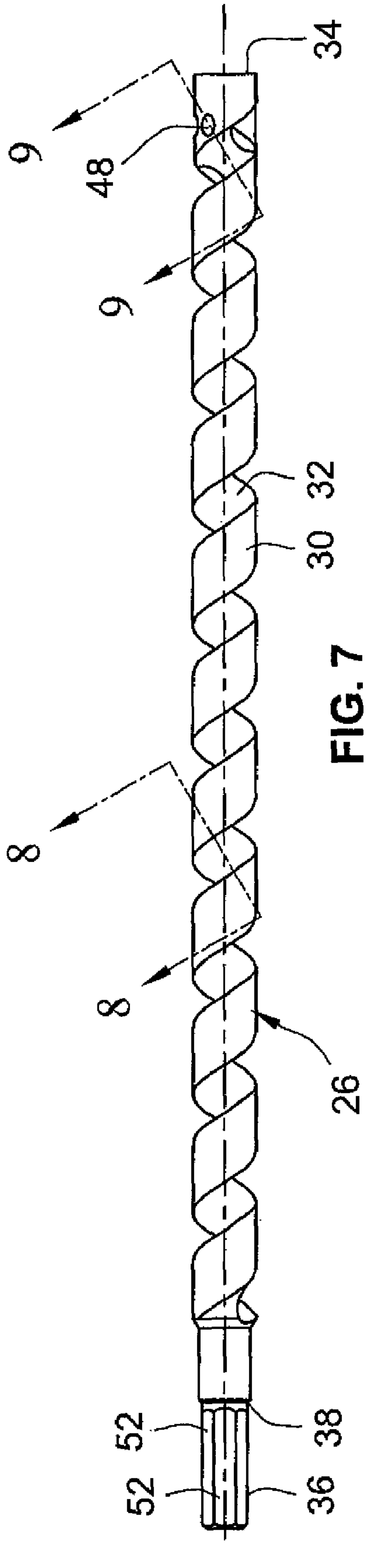
FIG. 7 is an alternate side elevational view of the shaft.
Figure 15:
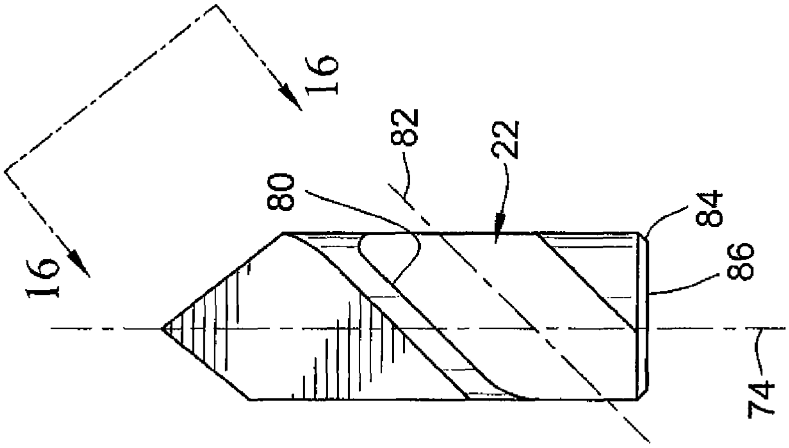
FIG. 15 is a side elevational view of the insert.
Figure 16:
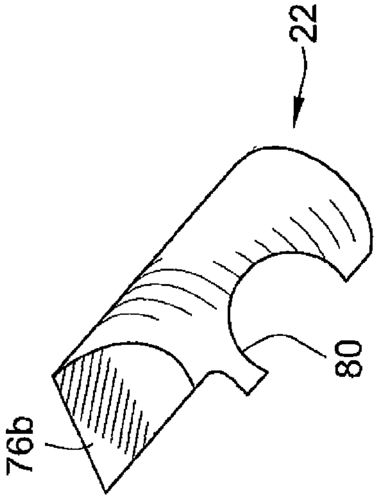
FIG. 16 is a view of the insert along the view of line 16-16 in FIG. 15.
Figure 17:
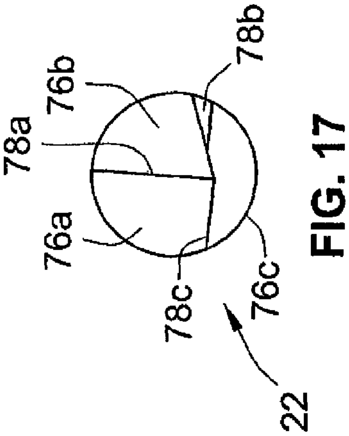
FIG. 17 is an end plan view of the insert.
Figure 18:
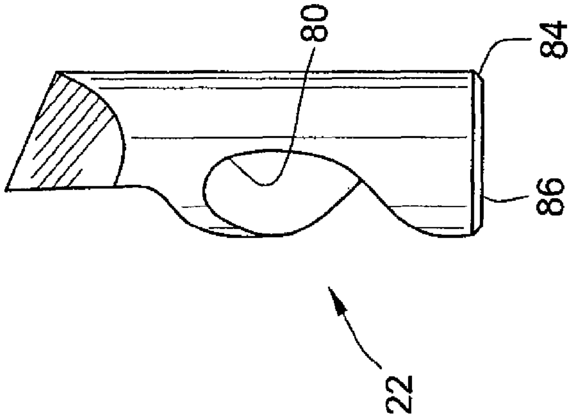
FIG. 18 is an alternate side elevational view of the insert.

FIGS. 1-3 shows an auger bit 20 that has a replaceable cutting insert 22 and a replaceable feed screw 24 attached to a shaft 26 of the auger bit. The cutting insert 22 and the feed screw 24 are attached to the shaft 26 using a single set screw 28.

The shaft 26 has a continuous land 30 and flute 32 which extends from a leading end 34 of the shaft 26 to a shank 36 which is provided at a trailing end 38 of the shaft 26. A central axis 39 extends along the length of the shaft 26 from the leading end 34 to the rearmost end of the shank 36. The outer periphery of the land 30 is formed as a cutting edge. A groove 40 extends from the cutting insert 22 to the trailing end 36 and allows the removal of chips as the auger bit 20 bores a hole. The shaft 26 has first, second and third passageways 42, 44, 46 proximate to its leading end 34 that allow the cutting insert 22, the feed screw 24 and the set screw 28 to be inserted into the shaft 26. In addition, a fourth passageway 48 is provided proximate to the leading end 34 of the shaft to allow a user to place an implement within the fourth passageway 50 to force the cutting insert 22 out of the shaft 26 when desired.

The shank 36 has a smaller diameter than the shaft 26. The shank 36 has flats 52 thereon which are held in a chuck of a powered drill or impact wrench which can be used by the user to cause the auger bit 20 as a whole to rotate.

The first passageway 42 forms the passageway into which the cutting insert 22 is mounted. The wall which forms the first passageway 42 is smooth. The first passageway 42 has a central axis 54 that intersects near the edge that would be formed by the leading end 34 and the circumference of the shaft 26. The central axis 54 forms an acute angle with the central axis 39 of the shaft 26. Preferably, the acute angle is forty-five degrees which prevents any thin areas that could occur near the leading end 34 of the shaft 26 if the angle were greater, such as ninety degrees. The first passageway 42 terminates at a predetermined distance into the shaft 26 at a floor or stop surface 56. The depth of the first passageway 42 is great enough so that the first passageway 42 passes through the central axis 39 of the shaft 26.

The second passageway 44 forms the passageway into which the feed screw 24 is mounted. The wall which forms the second passageway 44 is generally cylindrical and smooth. The second passageway 44 extends from the leading end 34 of the shaft 26 rearwardly coincident with the central axis 39 of the shaft 26 a predetermined depth.

The third passageway 46 forms the passageway into which the set screw 28 is mounted. The third passageway 46 is located on the circumference of the shaft 26 at a predetermined distance from the leading end 34. The third passageway 46 has a central axis 58 that is perpendicular to the central axis 39 of the shaft 26 and intersects the second passageway 44. Unlike the first and second passageways 42, 44 which have smooth walls, the third passageway 46 has an internal thread thereon, such as a ¼-28 internal thread so it can mate with the set screw 28 as fully described herein. The positioning of the third passageway 46 is chosen to make sure that it is not too close to the groove 40 of the shaft 26, which could compromise the structural integrity of the third passageway 46.

The fourth passageway 48 is concentric with the first passageway 42 and extends from the stop surface 56 to the other side of the shaft 26. The fourth passageway 48 has a smaller diameter than the first passageway 42. The wall which forms the fourth passageway 48 is smooth.

The shaft 26 with these features can be made from 1144 stress proof round stock on a multi-tasking lathe such that the outer dimensions are tuned, the passageways 42, 44, 46, 48 are bored or drilled, and the flats 52 are milled. Finally, the groove 40 is milled into the shank 34 using a whirler machine. Since the stock is pre-hardened, no further heat treatment is required.

Figure 13:
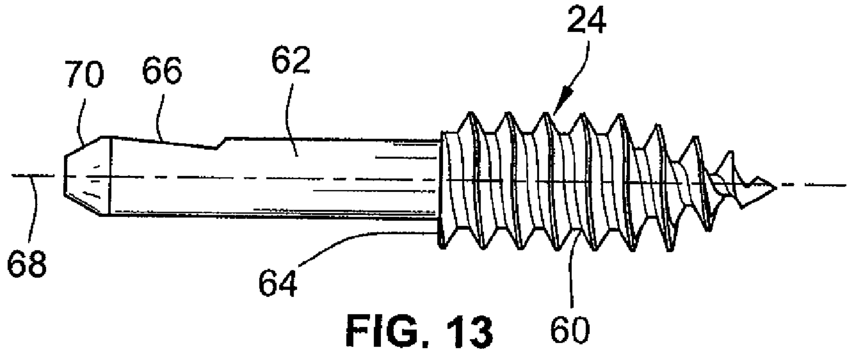
FIG. 13 is a side elevational view of the feed screw.
Figure 14:
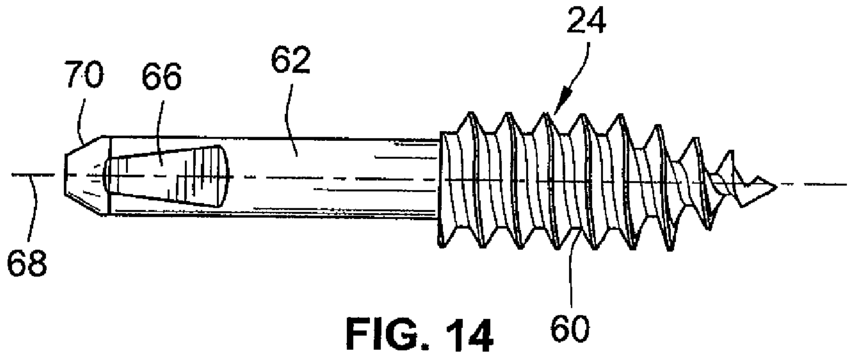
FIG. 14 is an alternate side elevational view of the feed screw.

FIGS. 13 and 14 illustrate the construction of the feed screw 24. The feed screw 24 includes a generally conical portion 60 on one end that has male threads thereon. Extending from threaded portion 60 is a stem 62 having a cylindrical shape and a diameter that is less than the threaded portion 60 creating an annular shoulder 64 at the bottom of the threaded portion 60. The stem 62 has a flat surface 66 proximate to its rear end that forms an acute angle, such as five degrees, with respect to a central axis 68 of the stem portion 62, such that the depth of the depression created by the flat surface 66 is deepest near the threaded portion 60 and decreases as the flat surface 66 nears the rear end of the stem 62. The stem 62 is mounted into the second passageway 44. This construction helps to retain the feed screw 24 within the shaft 26 as described herein. The rear end of the feed screw 24 has a taper 70 that facilitates assembly of the auger bit 20 as will be more fully herein. The feed screw 24 can be manufactured by a cold headed blanking operation out of medium carbon steel to produce the overall shape. Next, the threads can be rolled onto its conical portion 60 and the flat surface 66 can then be milled or ground onto the stem 62. Finally, the feed screw 24 can be heat treated to forty-five to fifty-five Rockwell scale C.

FIGS. 15-18 show the cutting insert 22. The cutting insert 22 includes a generally cylindrical body 72 having first and second ends and a central axis 74. Three flats 76*a*, 76*b*, 76*c* that form cutting edges 78*a*, 78*b*, 78*c* are formed at one end of the generally cylindrical body 72. The generally cylindrical body 72 has a shape that corresponds to the first passageway 42 in the shaft 26. A groove 80 is formed in the generally cylindrical body 72 and has a central axis 82 that forms a forty-five degree angle with the central axis 74 of the generally cylindrical body 72. The groove 80 mates with a portion of the feed screw 24 as described herein. A chamfer 84 is located around the perimeter of the second end of the generally cylindrical body 72. The second end forms an abutment surface 86. The cutting insert 22 can be manufactured out of S-7 tool steel using a screw machine or multi-tasking lathe, such that its general shape is turned and the flats 76*a*, 76*b*, 76*c* and groove 80 are milled thereon. The cutting insert 22 is then heat treated to a range of fifty to sixty Rockwell scale C.

The auger bit 20 can be assembled in the following manner. First, the user inserts the cutting insert 22 into the first passageway 42 with the abutment surface 86 facing the stop surface 56 of the first passageway 42 until the abutment surface 86 bottoms out on the stop surface 56. At this point, the cutting insert 22 is free to rotate within the first passageway 42 and the cutting edges 78*a*, 78*b*, 78*c* are located near the edge defined by the front end 34 and the outer wall of the shaft 26. Next, the user inserts the stem 62 of the feed screw 24 into the second passageway 44 of the shaft 26 located on its front end 34 and pushes the feed screw 24 into the shaft 26 until the taper 70 on the feed screw 24 contacts the cutting insert 22. At this point, the groove 80 of the cutting insert 22 is not necessarily aligned with second passageway 44 or the stem 62 of the feed screw 24, so the user usually must rotate the cutting insert 22 until the edge of the groove 80 contacts the stem 62 of the feed screw 24. Once this happens, the user simply pushes on the feed screw 24 and the taper 70 will rotate the cutting insert 22 until the groove 80 is completely aligned with the stem 62 of the feed screw 24. Once the annular shoulder 64 bottoms out on the front end 34 of the shaft 26, the stem 62 has passed completely through the groove 80 of the cutting insert 22 and past the groove 80, thereby fixing the orientation of the cutting insert 22 and preventing the removal of the cutting insert 22 from the shaft 26.

The depth of second passageway 44 is greater than the length of the stem 52, ensuring that the feed screw 24 can be properly seated with no gaps between its threaded portion 60 and the front end 34 of the shaft 26. The depth of the first passageway 42 is greater than the distance from the groove 80 of the cutting insert 22 to its abutment surface 86, ensuring that the groove 80 can properly align the stem 62 of the feed screw 24, while at the same time the cutting edges 78*a*, 78*b*, 78*c* are located directly next to the groove 40 of the shaft 26 despite any possible dimensional variances due to manufacturing tolerances. The gap between the abutment surface 86 of the cutting insert 22 and the stop surface 56 of the first passageway 42 of the shaft 26 is small enough, e.g. a thirty second of an inch, to minimize the amount of possible misalignment between the groove 80 of the cutting insert 22 and the second passageway 44, thereby easing assembly. Once the cutting insert 22 and feed screw 24 have been installed, the portions of the cutting edges 78*a*, 78*b*, 78*c* that are nearest the tip of the feed screw 24 in a direction that is parallel to the central axis 39 of the shaft 26 extend past the last thread of the feed screw 24, helping to make sure that as the auger bit 20 passes through the pole it is pulled through by the threads of the feed screw 24 until the hole is complete, easing the drilling operation.

The last step in assembling the auger bit 20 is to insert the set screw 28 whose external threads match the internal threads of the third passageway 46 and tighten the set screw 28 until it approaches the stem 62 of the feed screw 24. The user must then rotate the feed screw 24 so that the flat surface 66 is aligned with the third passageway 46. Finally, the set screw 28 is tightened until it contacts the flat surface 66, which due to its angle, exerts some force that urges the feed screw 24 toward a fully seated position. This prevents the feed screw 24 from being extracted from the shaft 26 by the force created by land 30 as the land 30 engages a workpiece or pole.

Disassembly of the auger bit 20 may be achieved by reversing the above process. Sometimes, debris or slight deformation may cause the removal of the cutting insert 22 to be difficult. Consequently, the fourth passageway 48 allows a user to insert an implement, such as a punch used with a hammer, to dislodge the cutting insert 22 forcibly.

As can be seen, the auger bit 20 provides an insert 22 and feed screw 24 that can be selectively replaced depending on what damage or dulling has occurred. The auger bit 20 further holds the insert 22 and feed screw 24 in place using a single locking member, set screw 28. Other locking members are within the scope of the present invention as would be know to one of ordinary skill in the art. Hence, this auger bit 20 satisfies the needs of an auger bit 20 whose features which are subject to wear can be replaced quickly and cost effectively.

While a preferred embodiment of the present invention is shown and described, it is envisioned that those skilled in the art may devise various modifications of the present invention without departing from the spirit and scope of the appended claims.

The invention claimed is:

1. An auger bit comprising:

a shaft having a central axis, a first passageway having a central axis which is angled at an acute angle relative to the central axis, said first passageway at least partially passing through said central axis, and a second passageway which is concentric with said central axis;

a cutting insert mounted to said shaft in said first passageway;

a feed screw that is separate from the cutting insert, said feed screw mounted to said shaft in said second passageway, said cutting insert and said feed screw engaged with each other; and a locking member securing the feed screw member to the shaft.

2. An auger bit as defined in claim 1, wherein said shaft includes a third passageway in which said locking member is mounted, said third passageway intersecting with said second passageway.

3. An auger bit as defined in claim 2, wherein said third passageway is perpendicular to said second passageway.

4. An auger bit as defined in claim 1, wherein said shaft includes a passageway which is smaller in dimension than said first passageway and which intersects with said first passageway.

5. An auger bit as defined in claim 1, wherein said feed screw has a shaft, and said cutting insert includes a groove, said shaft of said feed screw being positioned within said groove in said cutting insert.

6. An auger bit as defined in claim 5, wherein said cutting insert includes a generally cylindrical body with a central axis having a first end and a second end, cutting edges formed on said first end, and a groove having a central axis that forms a forty-five degree angle with said central axis of the body.

7. An auger bit as defined in claim 1, wherein said feed screw has a generally cylindrical shank, and a flat surface provided on said shank, said locking member engaging against said flat surface.

8. An auger bit as defined in claim 1, wherein said feed screw has a generally conically shaped threaded portion having a first end, a second end and a central axis defined therebetween, said first end having a diameter which is less than a diameter at said second end, a stem extending from said second end of said threaded portion, said stem having a first end, a second end and a central axis defined therebetween, said stem having a diameter that is less than the diameter of said threaded portion at said second end, and a flat surface that forms a depression within the stem and that forms an acute angle with the central axis of the stem, the depth of the depression lessening as the depression progresses away from the threaded portion.

9. An auger bit as defined in claim 8, wherein said acute angle is five degrees.

10. A shaft for a cutting tool comprising:

a continuous land and flute extending from a leading end to a trailing end, a shaft central axis extending between said leading end and said trailing end, a first passageway having a central axis angled relative to said shaft central axis, said first passageway at least partially passing through said shaft central axis, said first passageway having a diameter, and a second passageway having a central axis which is aligned with said central axis of said first passageway, said first and second passageways commencing at diametrically opposed positions along said shaft, said second passageway having a diameter which is smaller than said diameter of said first passageway.

11. A shaft as defined in claim 10, wherein said central axis of said first passageway forms an acute angle with the central axis of said shaft.

12. A shaft as defined in claim 10, further including a third passageway intersecting with said first passageway, said third passageway having a central axis aligned with said shaft central axis.

13. A shaft as defined in claim 12, further including a fourth passageway which intersects with said third passageway and is perpendicular to said shaft central axis.

14. An auger bit comprising:

a shaft having a central axis, a first passageway which has a central axis which is angled relative to the central axis of said shaft, said first passageway at least partially passing through the central axis of the shaft, a second passageway which is concentric with said central axis of said shaft, and a third passageway which is smaller in dimension than said first passageway and which intersects with said first passageway;

a cutting insert mounted to said shaft in said first passageway;

a feed screw that is separate from the cutting insert, said feed screw mounted to said shaft in said second passageway, said cutting insert and said feed screw engaged with each other; and a locking member securing the feed screw member to the shaft.

15. An auger bit comprising:

a shaft having a central axis;

a cutting insert mounted to said shaft, said cutting insert includes a generally cylindrical body with a central axis having a first end and a second end, cutting edges formed on said first end, and a groove having a central axis that forms a forty-five degree angle with said central axis of the body;

a feed screw having a shaft, said feed screw is separate from the cutting insert, said feed screw mounted to said shaft, said cutting insert and said feed screw engaged with each other such that said shaft of said feed screw is positioned within said groove in said cutting insert; and a locking member securing the feed screw member to the shaft.

* * * * *